(12) United States Patent
Yan et al.

(10) Patent No.: US 9,019,733 B2
(45) Date of Patent: Apr. 28, 2015

(54) THREE-PHASE AC-DC CONVERTER CIRCUIT AND CONVERSION METHOD AND CONTROL SYSTEM THEREOF

(75) Inventors: Chao Yan, Shanghai (CN); Ling-Jie Meng, Shanghai (CN); Mi Chen, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 386 days.

(21) Appl. No.: 13/488,240

(22) Filed: Jun. 4, 2012

(65) Prior Publication Data

US 2013/0215654 A1    Aug. 22, 2013

(30) Foreign Application Priority Data

Feb. 16, 2012   (CN) .......................... 2012 1 0035296
Mar. 13, 2012   (CN) .......................... 2012 1 0065827

(51) Int. Cl.
  *H02M 7/08*   (2006.01)
  *H02M 1/14*   (2006.01)
  *H02M 7/23*   (2006.01)
  *H02M 1/12*   (2006.01)
  *H02M 3/158*  (2006.01)

(52) U.S. Cl.
  CPC . *H02M 1/14* (2013.01); *H02M 1/12* (2013.01); *H02M 7/23* (2013.01); *H02M 2003/1586* (2013.01)

(58) Field of Classification Search
  USPC .......................................... 363/65, 67, 69–70
  See application file for complete search history.

(56) References Cited

U.S. PATENT DOCUMENTS

| | | | |
|---|---|---|---|
| 5,886,888 A * | 3/1999 | Akamatsu et al. | 363/65 |
| 6,385,057 B1 * | 5/2002 | Barron | 363/17 |
| 6,400,107 B1 * | 6/2002 | Nakatani et al. | 318/400.21 |
| 8,004,119 B2 | 8/2011 | Tsang et al. | |
| 2003/0218893 A1 * | 11/2003 | Tai et al. | 363/65 |

FOREIGN PATENT DOCUMENTS

| | | |
|---|---|---|
| CN | 101151790 B | 5/2010 |
| CN | 102223099 A | 10/2011 |
| TW | I338997 B | 3/2011 |

OTHER PUBLICATIONS

Bor-Ren Lin et al., "Implementation of a Three-Level Rectifier for Power Factor Correction", IEEE Transactions on Power Electronics, Sep. 2000, 891-900, vol. 15, No. 5.

* cited by examiner

*Primary Examiner* — Adolf Berhane
*Assistant Examiner* — Henry Lee, III
(74) *Attorney, Agent, or Firm* — CKC & Partners Co., Ltd.

(57) ABSTRACT

The embodiment of present invention provides a three-phase AC (Alternating Current)-DC (Direct Current) converter circuit, conversion method and the control system thereof. The converter circuit includes a three-phase AC power source having a first output terminal, a second output terminal and a third output terminal; a first AC-DC conversion module, a second AC-DC conversion module and a third AC-DC conversion module electrically connected to the first output terminal, the second output terminal and the third output terminal of the three-phase AC power respectively, and respectively have N1 pieces, N2 pieces and N3 pieces of AC-DC converters which are connected in parallel; and a DC side output terminal electrically connected to the parallel-connected output terminals of the first AC-DC conversion module, the second AC-DC conversion module and the third AC-DC conversion module, wherein at least one of N1, N2 and N3 is greater than or equal to 2.

24 Claims, 11 Drawing Sheets

THREE-PHASE AC-DC CONVERTER CIRCUIT AND CONVERSION METHOD AND CONTROL SYSTEM THEREOF

RELATED APPLICATIONS

This application claims priorities to Chinese Application Serial Number 201210035296.1, filed Feb. 16, 2012, and Chinese Application Serial Number 201210065827.1, filed Mar. 13, 2012, which are herein incorporated by references in its entirety.

BACKGROUND

1. Field of Invention

The present invention relates to a technical field of power electronics. More particularly, the present invention relates to a three-phase AC (Alternating Current)-DC (Direct Current) converter circuit for a power converter, a conversion method of the three-phase AC-DC converter circuit and a control system of the three-phase AC-DC converter circuit.

2. Description of Related Art

With the development of power electronic technology, requirements on the harmonic content in the input current of a power electronic converter are becoming higher and higher. Taking a three-phase power factor correction (PFC) circuit as an example, a harmonic wave of the input current of the three-phase PFC circuit is mainly generated from a current ripple caused by switching a high-frequency switching component. Thus, in order to reduce the harmonic wave of the input current, while switching frequency of the high-frequency switching component is maintained unchanged, a conventional solution increases the inductance in the three-phase PFC circuit or improves filtering effect at the EMI (electromagnetic interference) step, so as to reduce the current ripple. However, the inductance is increased by increasing the inductor's volume in the PFC circuit or in the EMI filter.

On the other hand, in a power electronic converter, taking the reliability of a circuit and the simplicity and convenience of its production into consideration, a multilevel circuit with a cascade structure is often used, thus the cascade structure almost has a DC bus, and a large electrolytic capacitor is often connected to the DC bus in parallel. For example, a common communication power supply module generally uses a two-stage structure with a DC bus. In the two-stage structure, a pre-stage circuit is often a PFC circuit, and a post-stage circuit is often a DC-DC conversion circuit. When the pre-stage circuit and the post-stage circuit are in a stable state, the mean value of the input power is equal to that of the output power but the transient input power is different from that of the output power. Thus, the electrolytic capacitor only allows the alternating current to pass through, so as to balance the difference between the transient powers of the pre-stage and post-stage circuits.

However, the electrolytic capacitor occupies a large volume in the power converter, thus increasing the cost. Furthermore, due to technology characteristics of the electrolytic capacitor, the electrolytic capacitor has to reduce its temperature rise as much as possible during operation in order to prolong its operation life. In general, the temperature rise of the electrolytic capacitor is mainly caused by two factors. One is the AC consumption on the equivalent series resistance of the electrolytic capacitor, and the other is the impact of environment temperature and heat dissipation conditions on the electrolytic capacitor as well as the impact of other heating generating components on the electrolytic capacitor. In the prior art, for the heat-dissipation problem of the electrolytic capacitor, one solution is to increase the number or volume of the electrolytic capacitor so as to reduce the equivalent series resistance thereof and thus reduce the loss. However, the increase of the number or volume of the electrolytic capacitor accordingly increases the volume of the whole system, thus reducing the power density of the converter. Another solution is merely to improve the heat dissipation capability of the electrolytic capacitor, such as increasing the amount of wind passing through the system. However, if the system is operated under a high-temperature environment, the heat dissipation of the electrolytic capacitor is not effective.

In view of the above, those in the industry are endeavoring to find the way to design a novel power converter, so as to reduce the inductance of the power converter or reduce the temperature rise of the electrolytic capacitor, or increase the power density of the power converter.

SUMMARY

In order to remove the obstacles in improving power density of the power converter of the prior art, the embodiment of the present invention provides a three-phase AC-DC converter circuit, a conversion method and a control system thereof.

The aspect of the present invention provides a three-phase AC-DC converter circuit. The three-phase AC-DC converter circuit includes a three-phase AC power source, a first AC-DC conversion module, a second AC-DC conversion module and a third AC-DC conversion module, and a DC side output terminal. The three-phase AC power source includes a first output terminal, a second output terminal and a third output terminal used for outputting a three-phase alternating current. The first AC-DC conversion module is electrically connected to the first output terminal of the three-phase AC power source, and the first AC-DC conversion module includes N1 number of parallel-connected AC-DC converters. The second AC-DC conversion module is electrically connected to the second output terminal of the three-phase AC power source, and the second AC-DC conversion module includes N2 number of parallel-connected AC-DC converters. The third AC-DC conversion module is electrically connected to the third output terminal of the three-phase AC power source, and the third AC-DC conversion module includes N3 number of parallel-connected AC-DC converters. The DC side output terminal is electrically connected to the parallel-connected output terminals of the first, the second and the third AC-DC conversion modules, thereby outputting a DC voltage. N1, N2 and N3 are all natural numbers, and at least one of N1, N2 and N3 is greater than or equal to 2.

In some embodiments, the AC-DC converter includes an input inductor and a rectifier circuit, and the input inductor is electrically connected between the three-phase AC power source and the rectifier circuit. The DC side output terminal is also connected with a DC bus capacitor in parallel. The rectifier circuit is a half-bridge, full-bridge or Vienna rectifier circuit. The three-phase AC-DC converter circuit further includes a driving controller. The driving controller controls each AC-DC converter of the first, the second and the third AC-DC conversion modules operating, and sets N AC-DC converters in the same AC-DC conversion module operating with a predetermined phase difference between respective driving control signals of the AC-DC converters, where N is a natural number greater than or equal to 2.

In some embodiments, N1, N2 and N3 may be greater than or equal to 2. When N1, N2 and N3 are all equal to 2, in the same AC-DC conversion module the predetermined phase difference between respective driving control signals of the two AC-DC converters is greater than 0° and smaller than or equal to 180°. When N1, N2 and N3 are all greater than or equal to 3, in the same AC-DC conversion module the predetermined phase difference between respective driving control signals of the Nth AC-DC converter and the (N−1)th AC-DC converter is equal to the predetermined phase difference between respective driving control signals of the (N−1)th AC-DC converter and the (N−2)th AC-DC converter. Certainly, in other embodiments for a condition where N1, N2 and N3 are all greater than or equal to 2, in the same AC-DC conversion module the predetermined phase differences between driving control signals of any two converters may be not equal to each other depending on different design requirements.

In some other embodiments, the predetermined phase difference between respective driving control signals of two AC-DC converters in each of the three AC-DC conversion modules is equal to 360°/N. N is the number of AC-DC converters in the AC-DC conversion module.

Another aspect of the present invention provides a conversion method of the three-phase AC-DC converter circuit. In this conversion method, a three-phase AC-DC converter circuit and a three-phase AC power source is first provided. The three-phase AC-DC converter circuit includes at least three AC-DC conversion modules each correspondingly connected to one phase of the three-phase AC power source. At least one of the AC-DC conversion modules includes a plurality of parallel-connected AC-DC converters. The output terminals of the AC-DC conversion modules are connected in parallel to act as the DC side output terminal of the three-phase AC-DC converter circuit. Subsequently, in at least one AC-DC conversion module including multiple parallel-connected AC-DC converters, the AC-DC converters are controlled to be operated with a predetermined phase difference set between respective driving control signals of the AC-DC converters, so as to perform a conversion from AC to DC.

In some embodiments, the AC-DC converter is provided with an input inductor and a rectifier circuit. The input inductor is arranged between the three-phase AC power source and the rectifier circuit. Furthermore, the rectifier circuit is the Vienna rectifier circuit.

In some embodiments, the AC-DC converter circuit is provided with three AC-DC conversion modules each including two or more parallel-connected AC-DC converters. Respective AC-DC converters in each of the three AC-DC conversion modules are controlled to be operated with a predetermined phase difference set between driving control signals of the AC-DC converters. The phase difference between driving control signals of two AC-DC converters in the same AC-DC conversion module is controlled to be equal to 360°/N. Alternatively, the phase difference between driving control signals of two AC-DC converters in the same AC-DC conversion module is not limited to 360°/N depending on design requirements.

A further aspect of the present invention provides a control system of the three-phase AC-DC converter circuit. The control system includes a three-phase reference current generating circuit, multiple current error regulators and a driving controller. The three-phase reference current generating circuit receives a voltage signal at the DC side output terminal of the three-phase AC-DC converter circuit, a reference output voltage signal, and a phase voltage signal from each phase of the three-phase AC power source, and outputs three phase reference current signals. The number of the current error regulators is equal to that of the AC-DC converters. Each current error regulator receives one of the three phase reference current signals, and receives an input current sampling signal from an AC-DC converter in the AC-DC conversion module corresponding to the phase reference current signal, and outputs a current regulating signal for regulating the AC-DC converter corresponding to the received input current sampling signal of the AC-DC converter. The driving controller stores the predetermined phase difference between respective driving control signals of two or more AC-DC converters in each AC-DC conversion module, and receives multiple current regulating signals from multiple current error regulators, and then outputs driving control signals corresponding to the AC-DC converters in each AC-DC conversion module based on the stored predetermined phase difference between respective driving control signals of the AC-DC converters in each AC-DC conversion module.

In some embodiments, the three-phase reference current generating circuit includes a voltage regulator and a reference current constructor. The voltage regulator receives the voltage signal at the DC side output terminal of the AC-DC converter circuit and the reference voltage signal, and outputs a voltage regulating signal. The reference current constructor receives the voltage regulating signal and the phase voltage signal of each phase of the three-phase AC power source, and outputs three phase reference current signals. In these embodiments, the reference current constructor includes three multipliers. The three multipliers receive three phase voltage signals one to one from the three-phase AC power source, and the three multipliers all receive the voltage regulating signal. Each multiplier multiplies one phase voltage signal and the voltage regulating signal then output one corresponding phase reference current signal. Thus, the three multipliers output the three phase reference current signals together. The voltage regulator is a proportional-integral (PI) regulator, or a proportional-integral-derivative (PID) regulator or a proportional (P) regulator. The current error regulator is a proportional-integral (PI) regulator, or a proportional-integral-derivative (PID) regulator or a proportional (P) regulator.

By adopting the three-phase AC-DC converter circuit, the conversion method and the control system thereof in the disclosure, as the two or more AC-DC converters in at least one AC-DC conversion module are operated in a parallel interleaving mode, a smaller input current ripple wave is obtained, or the inductor may be small so as to get higher power density of a power converter. If, in the embodiment, the output terminal of the three-phase AC-DC converter circuit is connected with a DC bus capacitor in parallel, the three-phase AC-DC converter circuit provided by the disclosure can effectively reduce the RMS value of the current passing through the DC bus capacitor and alleviate the heat dissipation problem of the DC bus capacitor.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
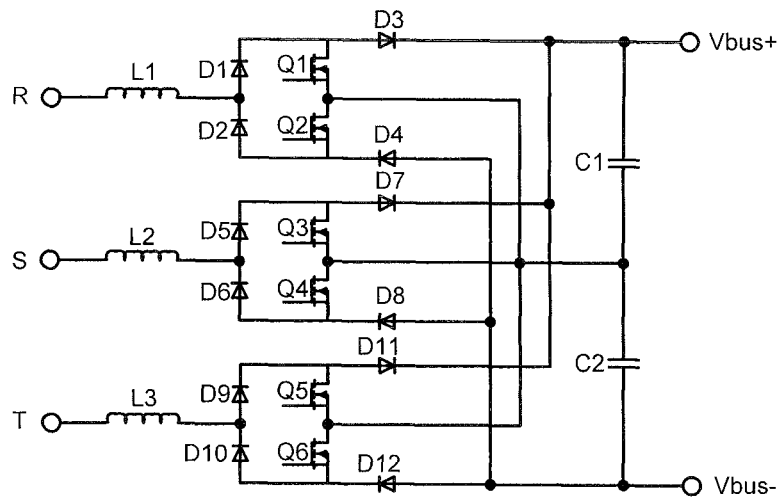
FIG. 1 illustrates a circuit block diagram of a three-phase AC-DC converter circuit.

In order to make the description of the present invention more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present invention. Moreover, the accompanying drawings are only illustrative and are not made according to the original size.

Specific implementations in some aspects of the present invention are further described in details below with reference to the accompanying drawings.

FIG. 1 illustrates a circuit block diagram of a three-phase AC-DC converter circuit. Referring to FIG. 1, the three-phase AC-DC converter circuit adopts the Vienna rectifier circuit architecture, and each phase of the three-phase AC-DC converter circuit includes a single converter. Taking phase R as an example, the converter includes an input inductor L1, a first bridge arm formed by serial-connected diodes D1 and D2, a second bridge arm formed by serial-connected switching tubes Q1 and Q2, and diodes D3 and D4. The input inductor L1 is connected between phase R of the three-phase AC power source and the midpoint of the first bridge arm. The diode D3 is arranged at the upper bridge arm side of the first bridge arm and at the positive output end of the DC side output terminal. The diode D4 is arranged at the lower bridge arm side of the first bridge arm and at the negative output end of the DC side output terminal. Moreover, the diodes D3 and D4 are arranged in opposite directions.

Figure 2:
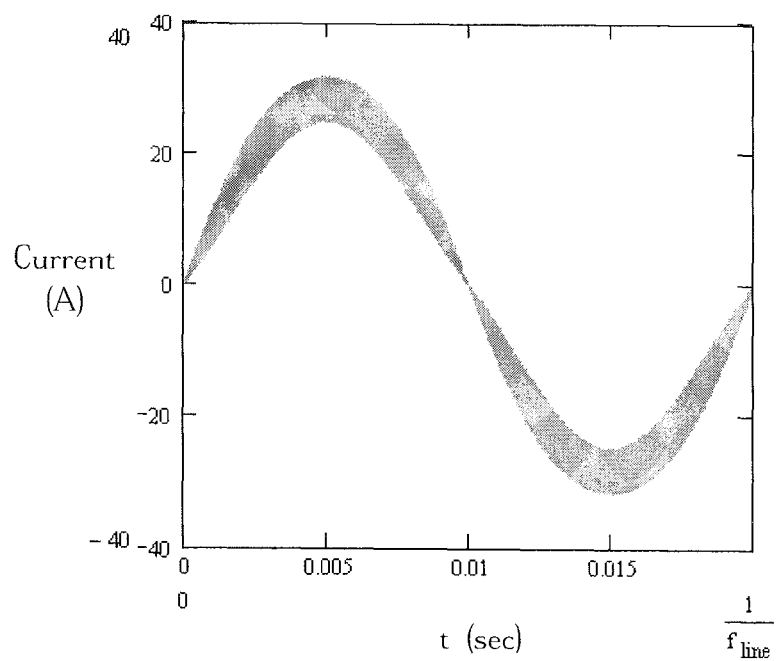
FIG. 2 illustrates a current waveform of a current passing through phase R in the three-phase AC-DC converter circuit of FIG. 1 during one line frequency cycle.
Figure 3:
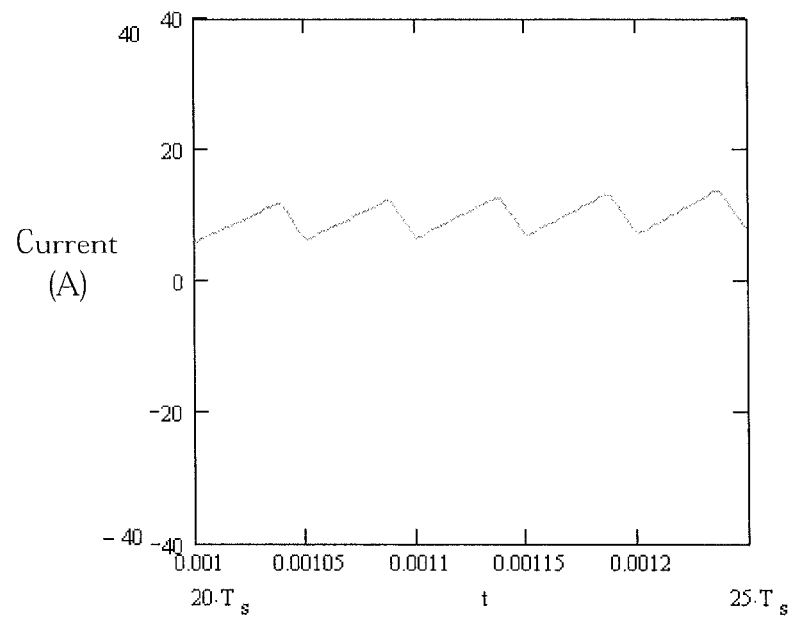
FIG. 3 illustrates a current waveform of a current passing through phase R in the three-phase AC-DC converter circuit of FIG. 1 during five switching cycles.

FIG. 2 illustrates a current waveform of a current passing through phase R in the three-phase AC-DC converter circuit of FIG. 1 during one line frequency ($f_{line}$) cycle. FIG. 3 illustrates a current waveform of a current passing through phase R in the three-phase AC-DC converter circuit of FIG. 1 during five switching cycles.

Referring both FIGS. 2 and 3, taking 200 VAC three-phase AC RMS (Root Mean Square), 800 V DC bus voltage, 12 kW power and 20 kHz switching frequency of the switching tubes as examples, if inductance of the input inductors L1, L2 and L3 are all 600 uH, the RMS value of current passing through phase R, i.e. through the input inductor L1 of phase R, during a line frequency cycle is 2 A, and the THD (Total Harmonic Distortion) of the current waveform is 10.05%, as shown in FIG. 2. Moreover, FIG. 3 illustrates the current waveform of the current passing through phase R during five switching cycles (i.e., from 20 Ts to 25 Ts).

Figure 4:
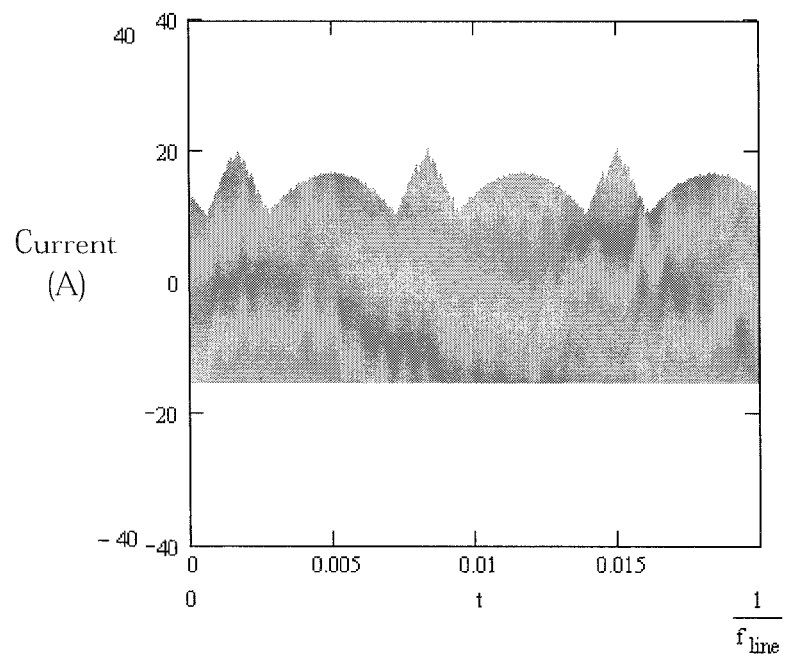
FIG. 4 illustrates a current waveform of a current passing through the DC bus capacitor C1 in the three-phase AC-DC converter circuit of FIG. 1 during one line frequency cycle.
Figure 5:
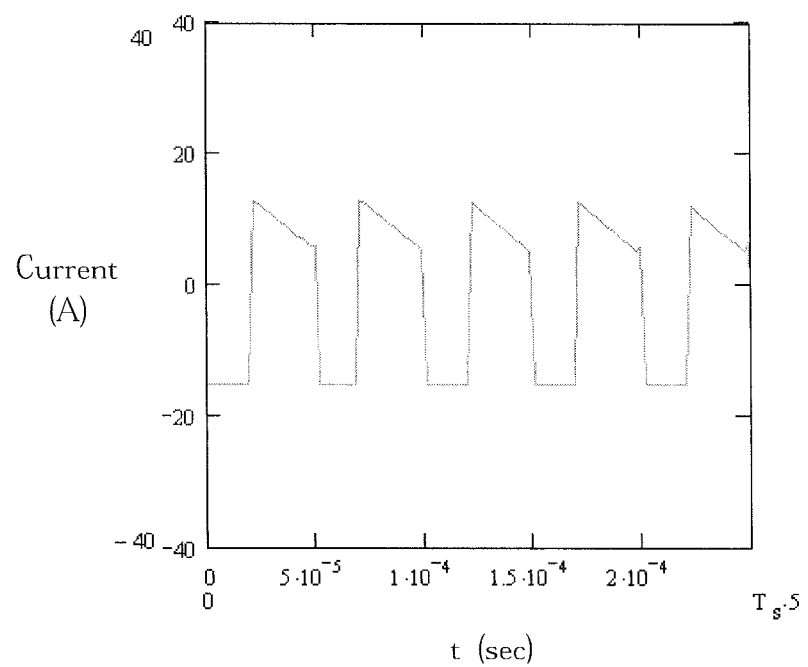
FIG. 5 illustrates a current waveform of a current passing through the DC bus capacitor C1 in the three-phase AC-DC converter circuit of FIG. 1 during five switching cycles.

FIG. 4 illustrates a current waveform of a current passing through the DC bus capacitor C1 in the three-phase AC-DC converter circuit of FIG. 1 during one line frequency cycle. FIG. 5 illustrates a current waveform of a current passing through the DC bus capacitor C1 in the three-phase AC-DC converter circuit of FIG. 1 during five switching cycles.

Referring both FIGS. 4 and 5, if the post-stage circuit of the three-phase AC-DC converter circuit has a resistive load and only absorbs the direct current (DC), the RMS value of the current passing through the DC bus capacitor C1 during one line frequency cycle is 12.89 A, as shown in FIG. 4. Moreover, FIG. 5 illustrates a current waveform of the current passing through the DC bus capacitor C1 during 5 switching cycles (i.e., from 0 Ts to 5 Ts).

In view of the above, in the three-phase AC-DC converter circuit, the Vienna circuit has advantages of high frequency, high switching frequency, low total cost, and can use a low-voltage-resistance semiconductor device. However, the ripple component of the input current in the converter circuit is large, and the electrolytic capacitor connected in parallel with the DC bus has a large temperature rise. In order to reduce the input current harmonic waves and reduce the temperature rise of the capacitor, the volume of the converter circuit often has to be increased, thus causing power density reduction in the converter circuit.

Figure 6:
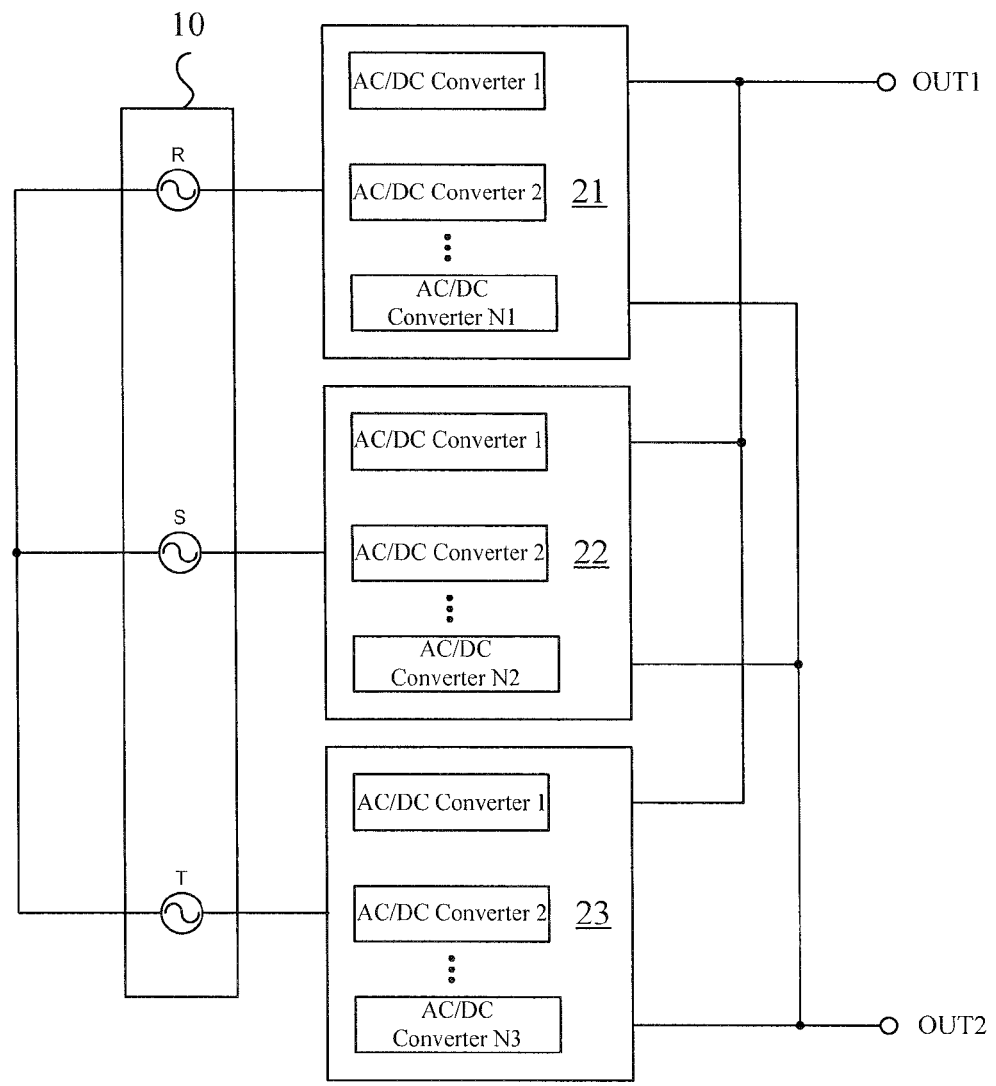
FIG. 6 illustrates a circuit block diagram of a three-phase AC-DC converter circuit according to an embodiment of the present invention.

FIG. 6 illustrates a circuit block diagram of a three-phase AC-DC converter circuit according to an embodiment of the present invention. Referring to FIG. 6, the three-phase AC-DC converter circuit includes a three-phase AC power source 10, a first AC-DC conversion module 21, a second AC-DC conversion module 22, a third AC-DC conversion module 23 and a DC side output terminal.

In particular, the three-phase AC power source 10 includes a first (phase R) output terminal, a second (phase S) output terminal and a third (phase T) output terminal. The three-phase alternating current (AC) is outputted by each output terminal of phase R, phase S and phase T. The first AC-DC conversion module 21 is electrically connected to the first output terminal of the three-phase AC power source 10, and includes N1 number of parallel-connected AC-DC converters (the AC/DC converter 1, the AC/DC converter 2, . . . , AC/DC converter N1). The second AC-DC conversion module 22 is electrically connected to the second output terminal of the three-phase AC power source 10, and includes N2 number of parallel-connected AC-DC converters (the AC/DC converter 1, the AC/DC converter 2, . . . , AC/DC converter N2). The third AC-DC conversion module 23 is electrically connected to the third output terminal of the three-phase AC power source 10, and includes N3 number of parallel-connected AC-DC converters (the AC/DC converter 1, the AC/DC converter 2, . . . , AC/DC converter N3). N1, N2 and N3 are all natural numbers, and at least one of N1, N2 and N3 is greater than or equal to 2.

Figure 7:
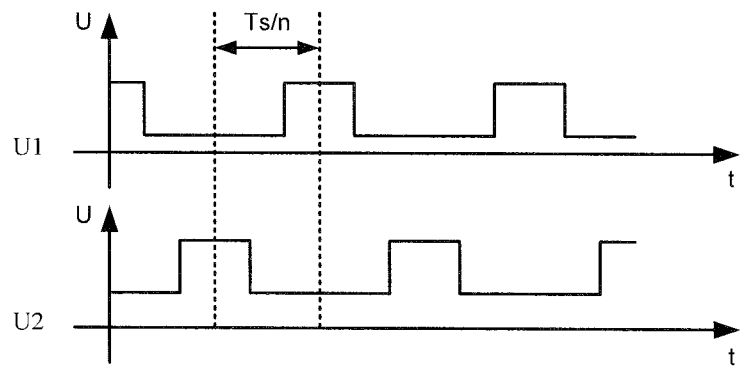
FIG. 7 illustrates a voltage waveform of each driving control signal of two AC-DC converters in the same phase of the three-phase AC-DC converter circuit shown in FIG. 6.
Figure 8:
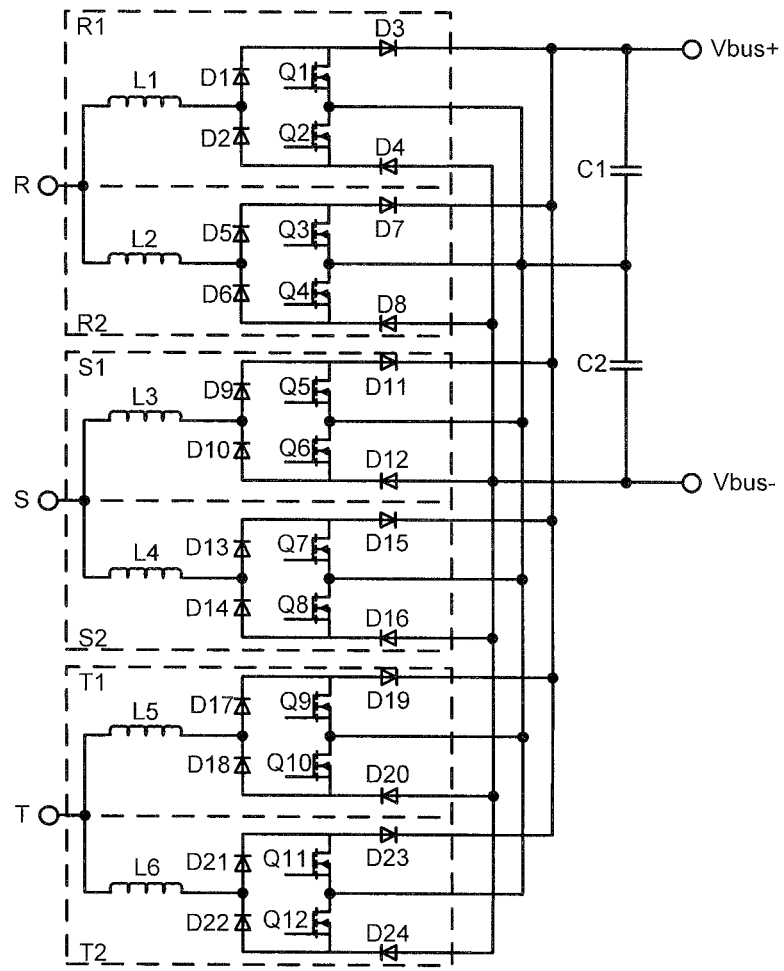
FIG. 8 illustrates a schematic circuit diagram of the three-phase AC-DC converter circuit shown in FIG. 6 according to a specific embodiment.

Referring to FIG. 7, it illustrates two driving control signals U1 and U2 corresponding to two AC-DC converters of two or more parallel-connected AC-DC converters included in an AC-DC conversion module according to an embodiment of the three-phase AC-DC converter circuit of the present invention. It can be seen from FIG. 7 that a predetermined phase difference exists between this two driving control signals so as to perform a phase-shifting operation mode of two AC-DC converters in the same AC-DC conversion module.

FIGS. 8-11 illustrate the topological structural views of the AC-DC converters included in the AC-DC conversion module of the three-phase AC-DC converter circuit of the disclosure. However, the present invention is not limited thereto. As shown in FIGS. 8-11, in the parallel-connected AC-DC converters R1 and R2 of phase R, parallel-connected AC-DC converters S1 and S2 of phase S, and the parallel-connected AC-DC converters T1 and T2 of phase T, each AC-DC converter includes an input inductor and a rectifier. The input inductor is electrically connected between the three-phase AC power source and the rectifier circuit. The rectifier circuit structure illustrated in FIGS. 8-11 is a half-bridge, full-bridge or Vienna rectifier circuit. These rectifier circuit structures are well known, and thus it is not further illustrated herein.

FIGS. 8-11 illustrate embodiments that the three AC-DC conversion modules in the three-phase AC-DC converter circuit all include two or more AC-DC converters. However, if only one AC-DC conversion module in the three-phase AC-DC converter circuit adopts a structure with multiple parallel-connected AC-DC converters, the input current harmonic waves in the AC-DC conversion module is reduced and the volume of the input inductor of each converter is reduced to some extent. Certainly, when each of the three AC-DC conversion modules adopts a structure with multiple parallel-connected AC-DC converters, the three-phase input current harmonic waves of the AC-DC converter circuit of the embodiments are restrained as well.

Furthermore, in the embodiments of the three-phase AC-DC converter circuit of the present invention illustrated in FIGS. 8-11, the three-phase AC-DC converter circuit further includes a driving controller (not shown in FIGS. 6 and 8-11). As shown in FIG. 6, the driving controller controls the operation of each AC-DC converter of the first, second and third conversion modules 21, 22 and 23, and controls N number of AC-DC converters in the same AC-DC conversion module to be operated with a predetermined phase difference set between two of the N driving control signals, so as to perform a phase shifted operating mode among driving signals of N AC-DC converters in the same AC-DC conversion module. N is a natural number greater than or equal to 2.

Figure 9:
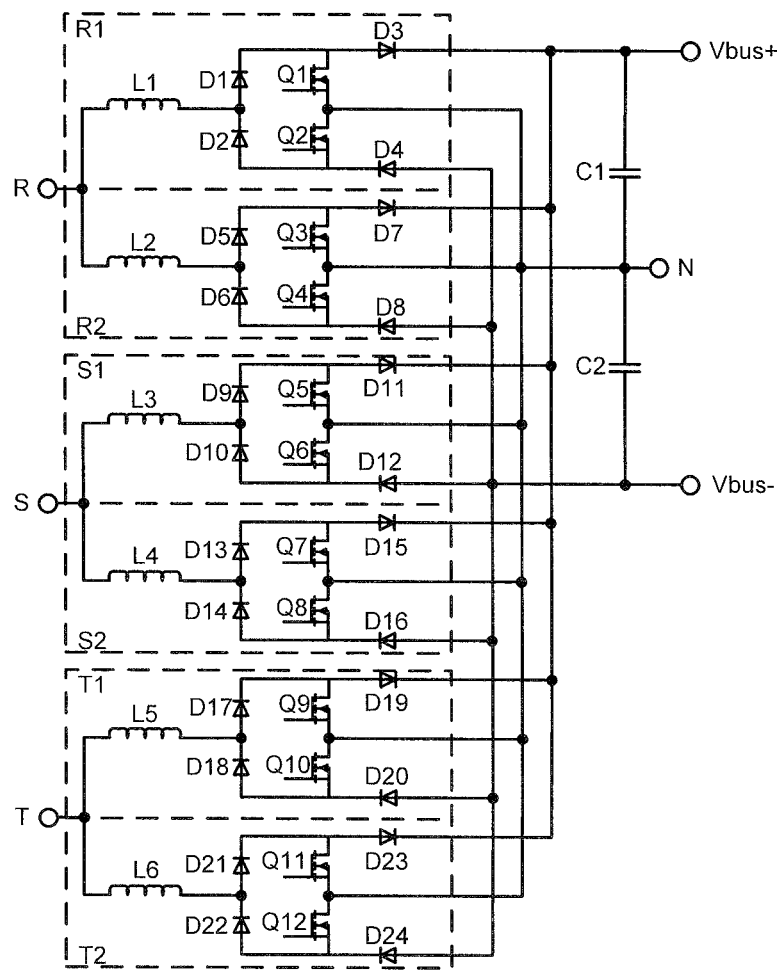
FIG. 9 illustrates a schematic circuit diagram of the three-phase AC-DC converter circuit shown in FIG. 6 according to another specific embodiment.
Figure 10:
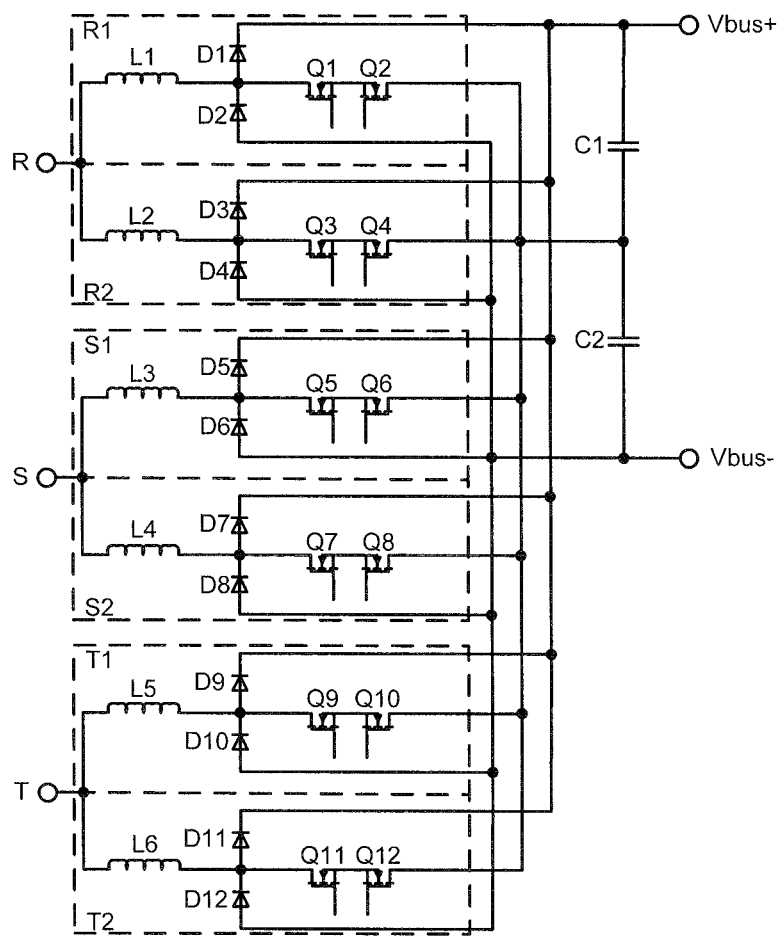
FIG. 10 illustrates a schematic circuit diagram of the three-phase AC-DC converter circuit shown in FIG. 6 according to a further specific embodiment.
Figure 11:
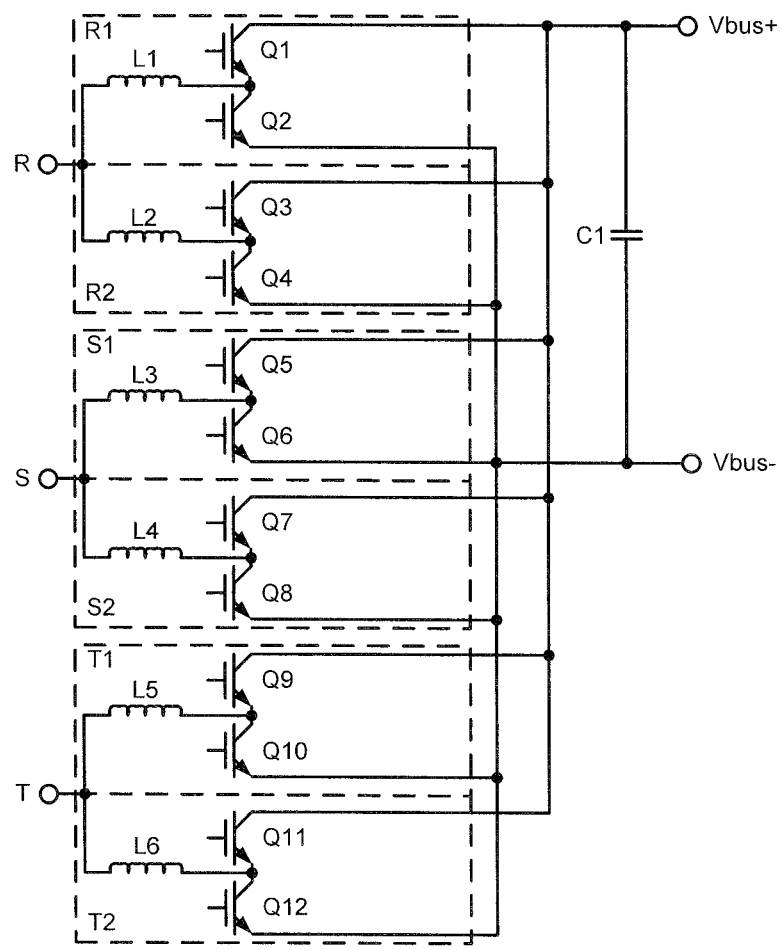
FIG. 11 illustrates a schematic circuit diagram of the three-phase AC-DC converter circuit shown in FIG. 6 according to still a further specific embodiment.

As shown in FIGS. 6 and 8-11, the DC side output terminal includes a positive output end OUT1 and a negative output end OUT2, and the DC side output terminal is electrically connected with parallel-connected output terminals of the first, second and third AC-DC conversion modules, for outputting a DC voltage. As shown in FIGS. 8-11, the DC side output terminal is connected with a DC bus capacitance branch in parallel, and the DC bus capacitance branch includes two serial-connected DC bus capacitors C1 and C2. Also as illustrated in FIG. 9, the two DC bus capacitors are jointed at a midpoint, and the midpoint is electrically connected with a neutral point N of the three-phase AC power source. Alternatively, as shown in FIG. 11, the DC side output terminal is connected with a DC bus capacitor C1 in parallel.

Thus, in the three-phase AC-DC converter circuit disclosed herein, no matter what topological DC bus capacitor structure is connected to the DC side output terminal, as long as phase shifting happens to the driving control signals of multiple AC-DC converters included in one AC-DC conversion module of the three-phase AC-DC converter circuit so as to perform a phase shifting operation mode among multiple AC-DC converters, the RMS value of the current from the DC bus capacitor passing through the DC side output terminal in the AC-DC converter circuit is reduced, such that the temperature rise problem of the DC bus capacitor is alleviated and the DC bus capacitance is reduced to some extent. Certainly, when the three AC-DC conversion modules all have multiple AC-DC converters, and the multiple AC-DC converters in each AC-DC conversion module are operating in a phase shifted mode, a better effect is obtained, which is not illustrated in details here anymore.

The embodiments of the three-phase AC-DC converter circuit of the present invention shown in FIGS. 8-11 are conditions where the three AC-DC conversion modules all include two AC-DC converters. For a condition where N is equal to 2, the predetermined phase difference between respective driving control signals of two AC-DC converters in the same AC-DC conversion module is greater than $0°$ and smaller than or equal to $360°/2$. Certainly, in some other embodiments of the AC-DC converter circuit of the present invention, there also exist conditions where N is greater than or equal to 3, and the predetermined phase difference between respective driving signals of two AC-DC converters in the same AC-DC conversion module may or may not be the same. In some other embodiments, in order to simplify the setting and controlling of each AC-DC driving control signal in the AC-DC conversion module, for a condition where N is greater than or equal to 3, the predetermined phase difference between respective driving control signals of the Nth AC-DC converter and the (N−1)th AC-DC converter is equal to the predetermined phase difference between respective driving control signals of the (N−1)th AC-DC converter and the (N−2)th AC-DC converter. No matter whatever N is, the predetermined phase difference between two AC-DC converters of the same AC-DC conversion module is greater than $0°$ and smaller than or equal to $360°/N$. However, in some embodiments, while the problems to be solved in the disclosure are settled, the control of the AC-DC conversion module can be further simplified, and the predetermined phase difference between driving control signals of two AC-DC converters in the same AC-DC conversion module including N AC-DC converters can be further set to $360°/N$.

It should be understood by those skilled in the art that, FIG. 6 not only illustrates a circuit block diagram of the three-phase AC-DC converter circuit of the embodiment, but also illustrates a conversion method corresponding to the three-phase AC-DC converter circuit. In this conversion method, a three-phase AC-DC converter circuit and a three-phase AC power source are provided. The three-phase AC-DC converter circuit includes at least three AC-DC conversion modules. Each AC-DC conversion module is correspondingly connected to one phase in the three-phase AC power source. At least one AC-DC conversion module in the AC-DC conversion modules includes two or more parallel-connected AC-DC converters. The output terminals of the three AC-DC conversion modules are connected in parallel to act as the DC side output terminal of the three-phase AC-DC converter circuit. In at least one AC-DC conversion module including multiple parallel-connected AC-DC converters, the AC-DC converters are controlled to be operated with a predetermined phase difference set between respective driving control signals of two AC-DC converters in one AC-DC conversion module which perform a conversion from AC to DC.

In some embodiments of the conversion method for the three-phase AC-DC converter circuit of the present invention, the three-phase AC-DC converter circuit is provided with three AC-DC conversion modules each of which includes two or more parallel-connected AC-DC converters. Correspondingly, respective AC-DC converters of each AC-DC conversion module in the three AC-DC conversion modules are controlled to be operated with a predetermined phase difference set between driving control signals of the AC-DC converters.

FIG. 7 illustrates voltage waveforms of respective driving control signals of two AC-DC converters in the same phase of the three-phase AC-DC converter circuit shown in FIG. 6. Referring to FIG. 7 and taking the first AC-DC conversion module of the three-phase AC-DC converter circuit as an example, U1 is a voltage waveform of the driving control signal of an AC-DC converter of the first AC-DC conversion module, and U2 is a voltage waveform of the driving control signal of another AC-DC converter of the first AC-DC conversion module. A periodic difference between the two voltage waveforms is Ts/n. Ts is an switching cycle of a switching tube in the AC-DC converter, and correspondingly, the phase difference between the voltage waveforms of the two driving control signals is 360°/N. The above embodiments of the AC-DC converter circuit have illustrated the control method of driving control signals of multiple AC-DC converters in the same AC-DC conversion module of the three-phase AC-DC converter circuit, and thus the control method will not be illustrated again.

Figure 12:
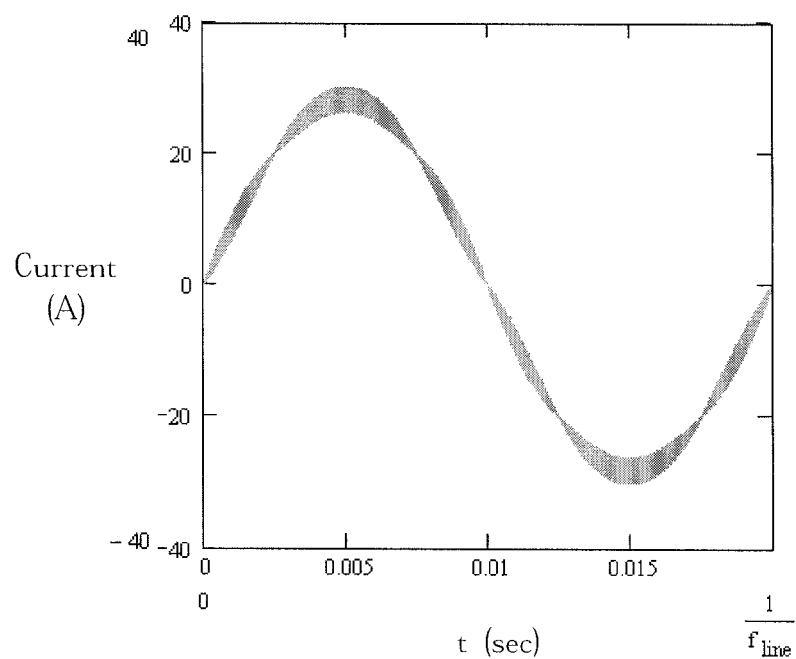
FIG. 12 illustrates a current waveform of a current passing through phase R in the three-phase AC-DC converter circuit of FIG. 9 during one line frequency cycle.
Figure 13:
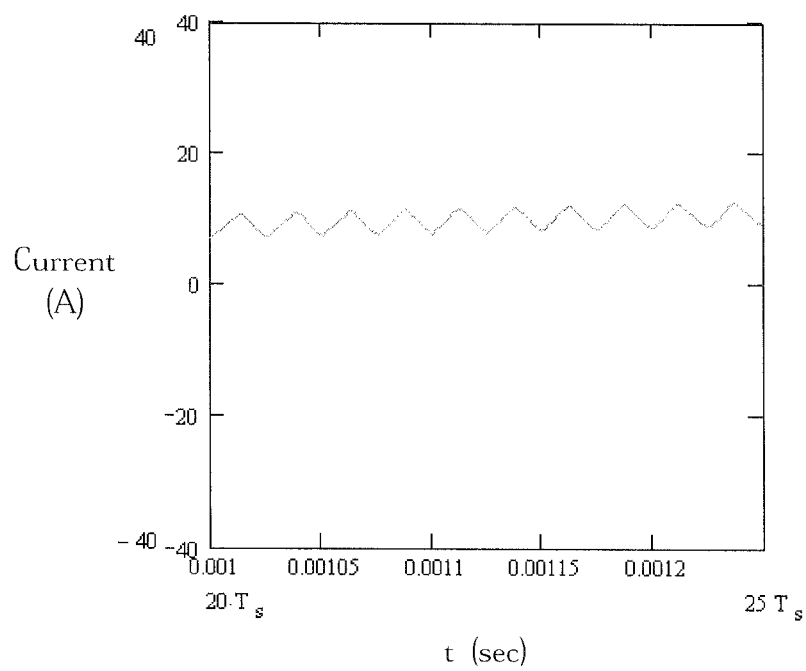
FIG. 13 illustrates a current waveform of a current passing through phase R in the three-phase AC-DC converter circuit of FIG. 9 during five switching cycles.

In the following described conversion method based on the AC-DC converter circuit shown in FIG. 9, the advantages of this conversion method are further illustrated. FIG. 12 illustrates a current waveform of a current passing through phase R in the three-phase AC-DC converter circuit of FIG. 9 during one line frequency cycle. FIG. 13 illustrates the current waveform of a current passing through phase R in the three-phase AC-DC converter circuit of FIG. 9 during 5 switching cycles.

Referring both FIG. 12 and FIG. 13, taking 200 VAC three-phase AC RMS (Root Mean Square), 800 V DC bus voltage, 12 kW power, and 20 kHz switching frequency of the switching tubes as examples for illustration, the inductance values of input inductors L1, L2, L3, L4, L5 and L6 are all 600 uH. After the three-phase AC-DC converter circuit of the disclosure is adopted, the RMS value of current passing through phase R during a line frequency cycle is 0.9 A, and the THD (Total Harmonic Distortion) of the current waveform is 4.5%, as shown in FIG. 12. Moreover, FIG. 13 illustrates the current waveform of the current passing through phase R during five switching cycles (i.e., from 20 Ts to 25 Ts). Compared with FIGS. 2 and 3, in FIG. 12, the RMS value of current passing through phase R during a line frequency cycle is decreased from 2 A to 0.9 A, and the THD of the current waveform is decreased from 10.05% to 4.5%. In view of the above, although the inductance is maintained unchanged, at least two AC-DC converters are arranged in each AC-DC conversion module so as to perform a phase shifting operation mode among driving control signals of respective switching tubes of the AC-DC converters, such that the ripple component of the input current is reduced, and the THD parameter index of the input current is improved or the volume of each AC-DC conversion module may get smaller.

Figure 14:
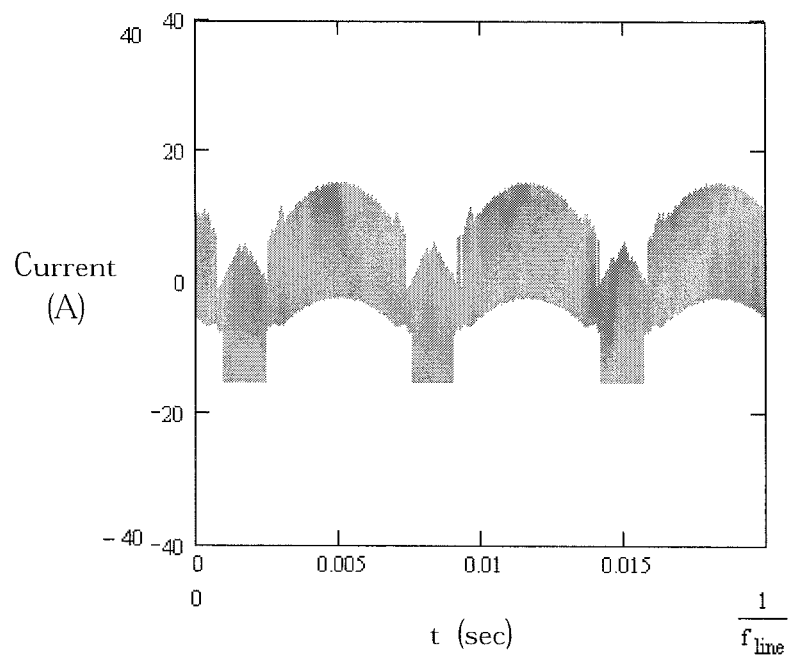
FIG. 14 illustrates a current waveform of a current passing through the DC bus capacitor C1 in the three-phase AC-DC converter circuit of FIG. 9 during one line frequency cycle.
Figure 15:
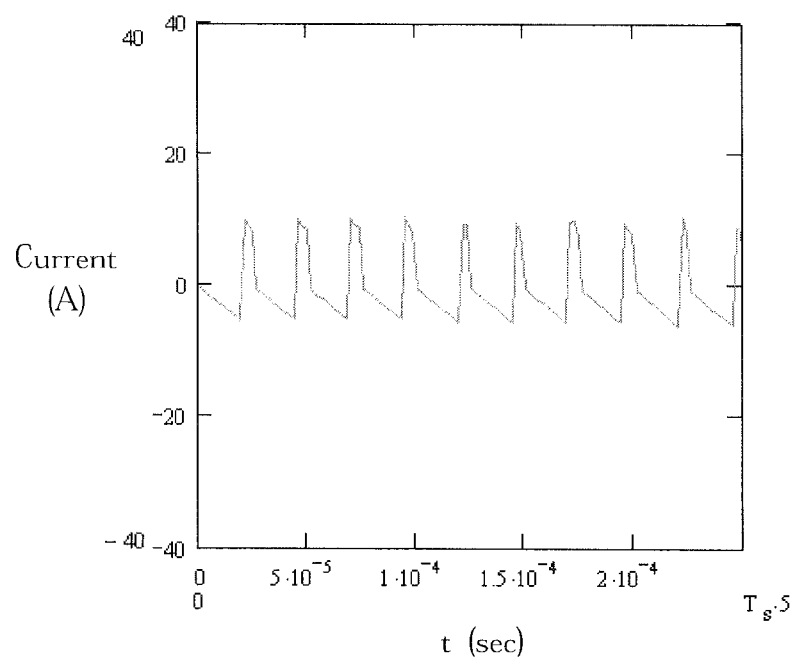
FIG. 15 illustrates a current waveform of a current passing through the DC bus capacitor C1 in the three-phase AC-DC converter circuit of FIG. 9 during five switching cycles.

In a specific embodiment, in order to reach the requirement of the same input current harmonic wave, i.e., in a condition where the current harmonic wave is maintained unchanged, at least two AC-DC converters are arranged in each AC-DC conversion module so as to perform a phase shifting operation mode, with a predetermined phase difference set between driving control signals of respective switching tubes of the AC-DC converters, such that the inductance of the input inductor of each AC-DC converter is reduced. This is because that, although the number of the inductor (has changed from the original one inductor L1 to two inductors L1 and L2) is twice of the original number, the inductance is directly proportional to the square of the number of turns. When the inductance is reduced, the number of turns is reduced while the same magnetic core is used, and under a condition having the same power in one conversion module, the current passing through the each inductor is reduced. Thus, a wire with a smaller diameter may be used for winding, thereby reducing the cost. Furthermore, in the disclosure, a magnetic core with a smaller volume may be used for manufacturing the inductor. Since, in the actual design, one conversion module with a big input inductor is adverse to reaching a high power density in the whole converter, multiple input inductors with smaller added volume are adopted in multiple AC-DC converters operating with phase shift in one AC-DC conversion module for easily achieving a high power density. FIG. 14 illustrates a current waveform of a current passing through the DC bus capacitor C1 in the three-phase AC-DC converter circuit of FIG. 9 during one line frequency cycle. FIG. 15 illustrates the current waveform of a current passing through the DC bus capacitor C1 in the three-phase AC-DC converter circuit of FIG. 9 during five switching cycles.

Referring both FIG. 14 and FIG. 15, if the post-stage circuit of the three-phase AC-DC converter circuit has a resistive load and only absorbs the direct current (DC), the RMS value of the current passing through the DC bus capacitor C1 during one line frequency cycle is 6.7 A. Thus, from the perspective of temperature rise of the capacitor, for the same temperature rise of the capacitor in a design, the three-phase AC-DC converter circuit in the disclosure can reduce the used number of capacitors, thereby reducing the cost. From the perspective of capacitance of the DC bus capacitor, for the same capacitance, the three-phase AC-DC converter circuit of the disclosure can effectively alleviate the heat generation problem of capacitor, and extend the operational life of the DC bus capacitor. Moreover, since, in each AC-DC conversion module, at least two parallel-connected AC-DC converters are operated in a phase shifting mode, a frequency doubling effect is achieved. That is, the ripple frequency of the input current is twice of the switching frequency, which can be seen from a comparison between FIGS. 3 and 13. FIG. 15 illustrates a current waveform of a current passing through the DC bus capacitor C1 during 5 switching cycles (i.e., from 0 to 5 Ts). It can also be seen from a comparison between FIGS. 5 and 15 that, in this embodiment, the ripple frequency of the current passing through the DC bus capacitor C1 is twice of the switching frequency.

Figure 16:
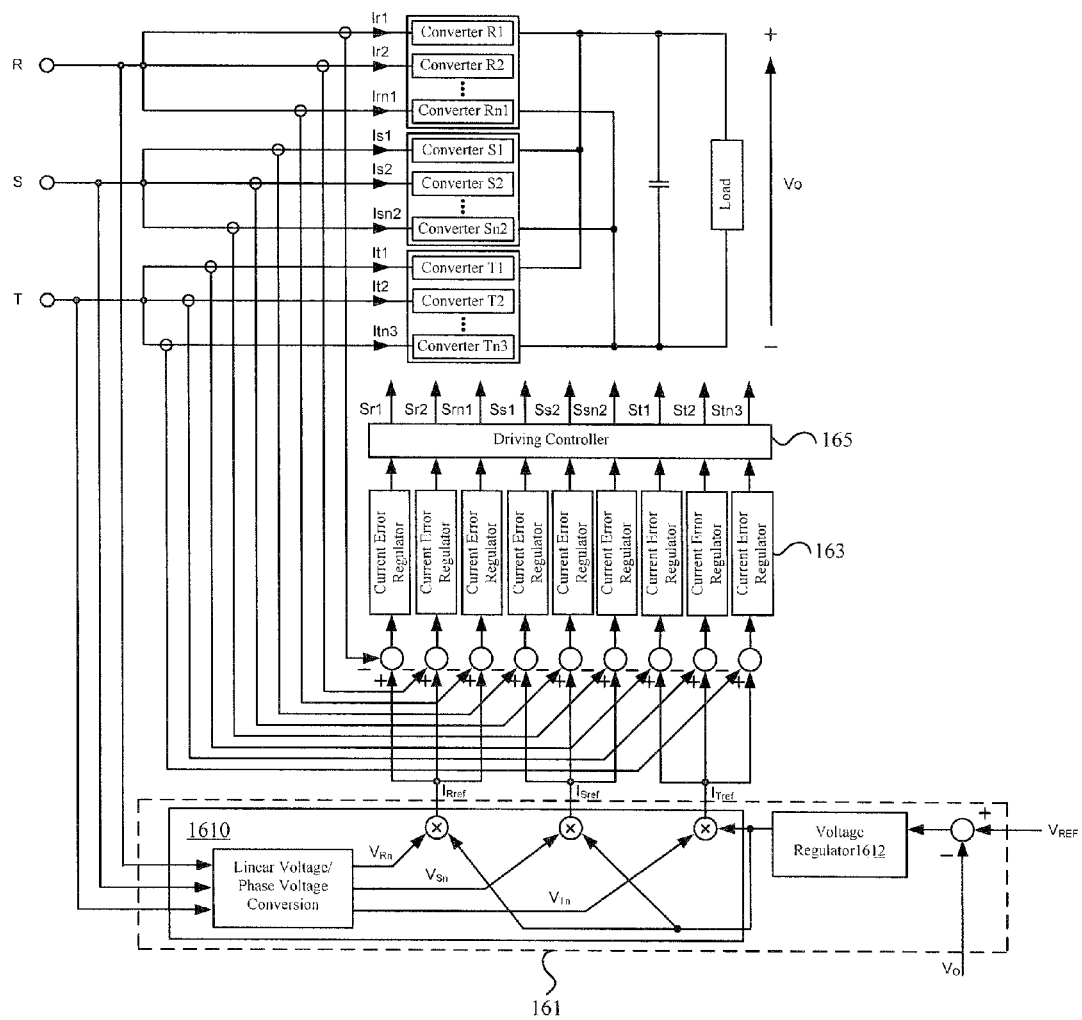
FIG. 16 illustrates a schematic circuit diagram of a control system for a three-phase AC-DC converter circuit according to another embodiment of the present invention.

FIG. 16 illustrates a schematic circuit diagram of a control system for a three-phase AC-DC converter circuit according to another embodiment of the present invention. Referring to FIG. 16, the control system includes a three-phase reference current generating circuit 161, multiple current error regulators 163 and a driving controller 165.

The three-phase reference current generating circuit 161 receives a voltage signal $V_O$ at the DC side output terminals of the three-phase AC-DC converter circuit, a reference output voltage signal $V_{REF}$, and a phase voltage signal of each phase of the three-phase AC power source, and outputs three phase reference current signals, i.e., the phase R reference current signal $I_{Rref}$, the phase S reference current signal $I_{Sref}$ and the phase T reference current signal $I_{Tref}$.

The number of the current error regulators 163 is the same as that of the AC-DC converters in the three-phase AC-DC converter circuit. Each current error regulator 163 receives one of the three phase reference current signals, and receives an input current sampling signal received by the current error regulator from an AC-DC converter in an AC-DC conversion module corresponding to the phase reference current signal, and outputs a current regulating signal for regulating output from the AC-DC converter corresponding to the received input current sampling signal. For example, in FIG. 16, the current error regulator 163 at the leftmost side receives the reference current signal $I_{Rref}$ of phase R and the input current sampling signal Ir1 from the AC-DC converter R1 in the first AC-DC conversion module, and thus outputs a current regulating signal for regulating the AC-DC converter R1 corresponding to the input current sampling signal Ir1. Also for example, in FIG. 16, the current error regulator 163 at the rightmost side receives the reference current signal $I_{Tref}$ of phase T and the input current sampling signal Itn3 from the AC-DC converter Tn3 in the third AC-DC conversion module, and thus outputs a current regulating signal for regulating the AC-DC converter Tn3 corresponding to the input current sampling signal Itn3. In a specific embodiment, the current error regulator 163 is a proportional-integral (PI) regulator, a proportional-integral-derivative (PID) regulator or a proportional (P) regulator.

The driving controller 165 stores the predetermined phase difference between respective driving control signals of two or more AC-DC converters in each AC-DC conversion module, and receives multiple current regulating signals from multiple current error regulators 163, and then outputs a driving control signal corresponding to the AC-DC converter in each AC-DC conversion module based on the stored predetermined phase difference. For example, the driving controller 165 outputs a driving control signal Sr1 corresponding to the AC-DC converter R1 based on the current error regulator 163 at the leftmost side. Also for example, the driving controller 165 outputs a driving control signal Stn3 corresponding to the AC-DC converter Tn3 based on the current error regulator 163 at the rightmost side. In a specific embodiment, the driving controller 163 is a PWM modulator, and the driving control signal outputted by the driving controller 163 is a PWM control signal.

In a specific embodiment, the three-phase reference current generating circuit 161 further includes a voltage regulator 1612 and a reference current constructor 1610. The voltage regulator 1612 receives the voltage signal $V_o$ at the DC side output terminal of the AC-DC converter circuit and the reference output voltage signal $V_{REF}$, and outputs a voltage regulating signal. The voltage regulator 1612 for example is a proportional-integral (PI) regulator, a proportional-integral-derivative (PID) regulator or a proportional (P) regulator. The reference current constructor 1610 receives the voltage regulating signal and the phase voltage signal of each phase in the three-phase AC power source, and outputs the three phase reference current signals $I_{Rref}$, $I_{Sref}$ and $I_{Tref}$. For example, the reference current constructor 1610 may first receives multiple linear voltage signals from the three-phase AC power source, and then converts each linear voltage signal into a phase voltage signal of the corresponding phase by a linear voltage/phase voltage conversion unit.

In another specific embodiment, the reference current constructor 1610 also includes three multipliers. The three multipliers receive a phase voltage signal from each phase of the three-phase AC power source one to one ($V_{Rn}$, $V_{Sn}$, $V_{Tn}$), and the three multipliers all receive the voltage regulating signal. Each multiplier multiplies a received phase voltage signal and the voltage regulating signal so as to output one of the three phase reference current signals. Thus, the three multipliers output three phase reference current signals together. For example, the multiplier at the leftmost side of the Figure outputs one of the three phase reference current signals, $I_{Rref}$. The multiplier at the rightmost side of the Figure outputs another one of the three phase reference current signals, $I_{Tref}$.

By adopting the three-phase AC-DC converter circuit, in the conversion method and the control system thereof of the disclosure, as the two or more AC-DC converters in at least one AC-DC conversion module are operated in a parallel interleaving mode, a smaller input current ripple wave is obtained while the inductance of the input inductor is small, and thus the power density of a power converter is increased. Furthermore, in the three-phase AC-DC converter circuit of the disclosure, as the multiple AC-DC converters in the same AC-DC conversion module are operated in an interleaving mode, the current passing through the DC bus capacitor/capacitors is further reduced for relieving the DC bus capacitor/capacitors problem of heat rise. The used number of capacitors and the occupied volume are also reduced, thereby reducing the design cost of the power converter.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A three-phase AC (Alternating Current)-DC (Direct Current) converter circuit, comprising:
    a three-phase AC power source comprising a first output terminal, a second output terminal and a third output terminal used for outputting a three-phase alternating current;
    a first AC-DC conversion module electrically connected to the first output terminal of the three-phase AC power source, the first AC-DC conversion module comprising N1 number of AC-DC converters connected in parallel;
    a second AC-DC conversion module electrically connected to the second output terminal of the three-phase AC power source, the second AC-DC conversion module comprising N2 number of AC-DC converters connected in parallel;
    a third AC-DC conversion module electrically connected to the third output terminal of the three-phase AC power source, the third AC-DC conversion module comprising N3 number of AC-DC converters connected in parallel;
    a DC side output terminal electrically connected to output terminals of the first AC-DC conversion module, the second AC-DC conversion module and the third AC-DC conversion module connected in parallel for outputting a DC voltage;
    wherein N1, N2 and N3 are all natural numbers, and at least one of N1, N2 and N3 is greater than or equal to 2.

2. The three-phase AC-DC converter circuit of claim 1, wherein N1, N2 and N3 are all greater than or equal to 2.

3. The three-phase AC-DC converter circuit of claim 1, wherein the AC-DC converter comprises an input inductor and a rectifier circuit, and the input inductor is electrically connected between the three-phase AC power source and the rectifier circuit.

4. The three-phase AC-DC converter circuit of claim 3, wherein the rectifier circuit is a half-bridge, full-bridge or Vienna rectifier circuit.

5. The three-phase AC-DC converter circuit of claim 1, further comprising a driving controller, wherein the driving controller controls an operation of each of the AC-DC converters of the first AC-DC conversion module, the second AC-DC conversion module and the third AC-DC conversion module, and controls N number of AC-DC converters in the same AC-DC conversion module to be operated in accordance with a predetermined phase difference set between respective driving control signals of the AC-DC converters, wherein N is a natural number greater than or equal to 2.

6. The three-phase AC-DC converter circuit of claim 5, wherein N is a natural number greater than or equal to 3, and in the same AC-DC conversion module, the predetermined phase difference between respective driving control signals of the Nth AC-DC converter and the (N−1)th AC-DC converter is equal to the predetermined phase difference between respective driving control signals of the (N−1)th AC-DC converter and the (N−2)th AC-DC converter.

7. The three-phase AC-DC converter circuit of claim 6, wherein the predetermined phase differences between respective driving control signals of the N number of AC-DC converters in the same AC-DC conversion module are all greater than 0° and smaller than or equal to 360° /N.

8. The three-phase AC-DC converter circuit of claim 5, wherein N is a natural number equal to 2, and the predetermined phase difference between respective driving control signals of two AC-DC converters in the same AC-DC conversion module is greater than 0° and smaller than or equal to 180°.

9. The three-phase AC-DC converter circuit of claim 5, wherein the DC side output terminal is connected to a DC bus capacitor in parallel.

10. The three-phase AC-DC converter circuit of claim 5, wherein the DC side output terminal is connected to a DC bus capacitance branch in parallel, the DC bus capacitance branch comprises two serial-connected DC bus capacitors jointed at a midpoint.

11. The three-phase AC-DC converter circuit of claim 10, wherein the midpoint is electrically connected to a neutral point of the three-phase AC power source.

12. A conversion method of a three-phase AC-DC converter circuit, comprising:
providing a three-phase AC-DC converter circuit and a three-phase AC power source, wherein the three-phase AC-DC converter circuit comprises at least three AC-DC conversion modules each of which is correspondingly connected to one phase of the three-phase AC power source, and at least one of the AC-DC conversion modules comprises a plurality of parallel AC-DC converters, and output terminals of the AC-DC conversion modules are connected in parallel to act as DC side output terminals of the three-phase AC-DC converter circuit; and
in at least one of the AC-DC conversion modules comprising a plurality of parallel AC-DC converters, controlling the AC-DC converters to be operated with a predetermined phase difference set between respective driving control signals of the AC-DC converters, thereby enabling a conversion from AC to DC.

13. The conversion method of claim 12, wherein the AC-DC converter circuit is provided with three AC-DC conversion modules each of which comprises two or more parallel-connected AC-DC converters.

14. The conversion method of claim 13, wherein each of the AC-DC converters in the three AC-DC conversion modules is controlled to be operated in accordance with a predetermined phase difference set between driving control signals of the AC-DC converters.

15. The conversion method of claim 12, wherein in the same AC-DC conversion module, the predetermined phase difference between respective driving control signals of the Nth AC-DC converter and the (N−1)th AC-DC converter is controlled to be equal to the predetermined phase difference between respective driving control signals of the (N−1)th AC-DC converter and the (N−2)th AC-DC converter, and N is a natural number greater than or equal to 3.

16. The conversion method of claim 15, wherein in the same AC-DC conversion module, the predetermined phase differences between respective driving control signals of N AC-DC converters are all greater than 0° and smaller than or equal to 360° /N.

17. The conversion method of claim 12, wherein two AC-DC converters are arranged in the same AC-DC conversion module and the predetermined phase difference between respective driving control signals of the two AC-DC converters is greater than 0° and smaller than or equal to 180°.

18. The conversion method of claim 12, wherein the AC-DC converter is provided with an input inductor and a rectifier circuit, and the input inductor is arranged between the three-phase AC power source and the rectifier circuit.

19. The conversion method of claim 18, wherein the rectifier circuit is a Vienna rectifier circuit.

20. A control system of the three-phase AC-DC converter circuit of claim 1, comprising:
a three-phase reference current generating circuit, wherein the three-phase reference current generating circuit receives a voltage signal at the DC side output terminal of the three-phase AC-DC converter circuit, a reference output voltage signal, and a phase voltage signal of each phase of the three-phase AC power source, and outputs three phase reference current signals;
a plurality of current error regulators, wherein the number of the current error regulators is equal to that of the AC-DC converters, and each current error regulator receives one of the three phase reference current signals and an input current sampling signal in an AC-DC converter of one AC-DC conversion module of the first AC-DC conversion module, the second AC-DC conversion module and the third AC-DC conversion module, and outputs a current regulating signal for regulating the AC-DC converter corresponding to the received input current sampling signal, wherein the AC-DC conversion module corresponds to one of the phase reference current signal received by the current error regulator; and
a driving controller, wherein the driving controller stores the predetermined phase difference between respective driving control signals of two or more AC-DC converters in the AC-DC conversion module, and receives a plurality of current regulating signals from the current error regulators, and then outputs driving control signals corresponding to the AC-DC converters in the same AC-DC conversion module based on the stored predetermined phase difference between respective driving control signals of the AC-DC converters in the AC-DC conversion module and driving control signals for the AC-DC converters in the other two AC-DC conversion module.

21. The control system of claim 20, wherein the three-phase reference current generating circuit comprises:
- a voltage regulator, wherein the voltage regulator receives the voltage signal at the DC side output terminal of the AC-DC converter circuit and the reference output voltage signal VREF, and outputs a voltage regulating signal; and
- a reference current constructor, wherein the reference current constructor receives the voltage regulating signal and the phase voltage signal of each phase of the three-phase AC power source, and outputs the three phase reference current signals.

22. The control system of claim 21, wherein the reference current constructor comprises:
- three multipliers for receiving the phase voltage signal from each phase of the three-phase AC power source in a one to one manner, wherein the three multipliers all receive the voltage regulating signal, and each of the multipliers multiplies a received phase voltage signal with the voltage regulating signal so as to output one of the three phase reference current signals, and thereby the three multipliers output the three phase reference current signals.

23. The control system of claim 21, wherein the voltage regulator is a proportional-integral regulator, a proportional-integral-derivative regulator or a proportional regulator.

24. The control system of claim 20, wherein the current error regulator is a proportional-integral regulator, a proportional-integral-derivative regulator or a proportional regulator.

* * * * *